Oct. 9, 1928.  1,687,130

A. HUNAU ET AL

CALCULATOR

Filed Jan. 3, 1923

INVENTOR
Paul Hammalian
Adolph Hunau

BY *Percy Freeman*

ATTORNEY

Patented Oct. 9, 1928.

1,687,130

UNITED STATES PATENT OFFICE.

ADOLPH HUNAU AND PAUL HAMMALIAN, OF NEW YORK, N. Y., ASSIGNORS TO H. & H. CALCULATING CORPORATION, OF NEW YORK, N. Y., A CORPORATION OF NEW YORK.

CALCULATOR.

Application filed January 3, 1923. Serial No. 610,474.

This invention relates to devices for automatically and expeditiously performing simple arithmetical calculations, as addition, subtraction, multiplication and division, in an easy and accurate manner.

One of the objects is to provide an extremely simple apparatus, comprised essentially of only two elements viz, a plate bearing a table composed of a series of rows of numerals arranged longitudinally and transversely of the plate and a slide also bearing a transverse row of numerals in column arrangement or registration with the numerals on the plate, the parts being so combined and arranged as to show the results of the computation clearly, merely a single movement being required.

Another object is to enable the immediate identification of the factors and the result of the calculation preferably by differentiating the factor rows by distinctively coloring the same and the result row by providing a slot in the slide through which the result row on the plate will be disclosed.

Another purpose is in the provision of an apparatus exceedingly compact, so that it can be as easily carried in a pocket as an ordinary business card.

A further aim is to produce a device for the foregoing purposes and which may be further used as an advertising medium, there being space for display purposes as well as for the necessary numerals used in making the computations.

These several aims, objects and purposes, together with others, such as economical construction, ease of assemblage and neatness of appearance, are accomplished by the novel design, arrangement and combination of parts hereinafter described and shown in the accompanying drawing, forming an essential part of this disclosure, and in which:—

Figure 1:
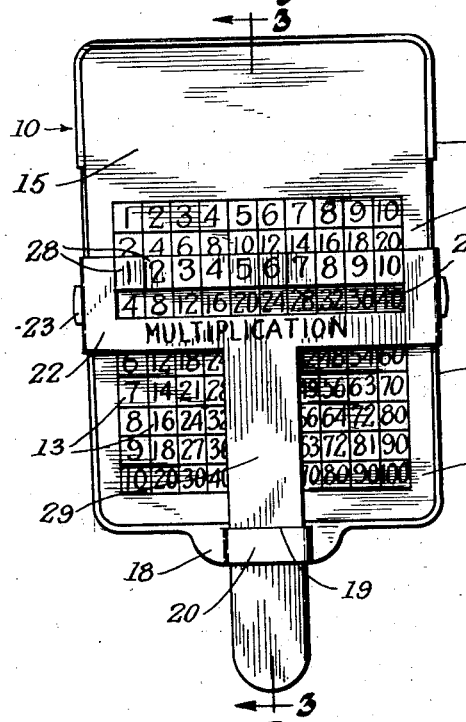
Figure 1 is a front elevational view of an embodiment of the invention, looking from one side thereof.
Figure 2:
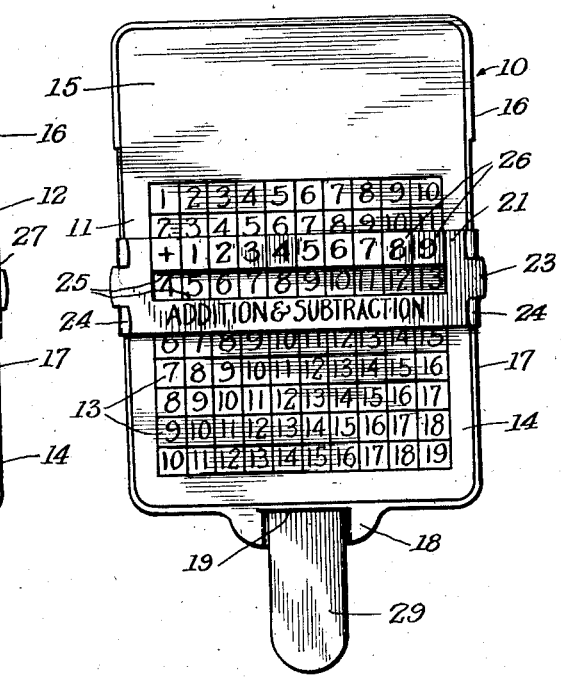
Figure 2 is a similar view looking from the reverse side.
Figure 3:
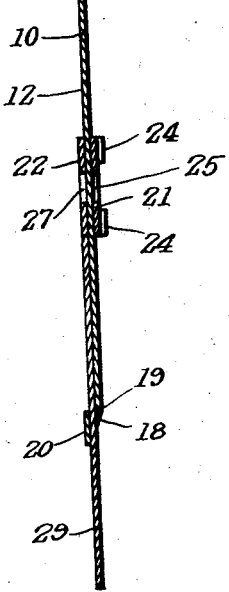
Figure 3 is a longitudinal sectional view taken on line 3—3 of Figure 1.
Figure 4:
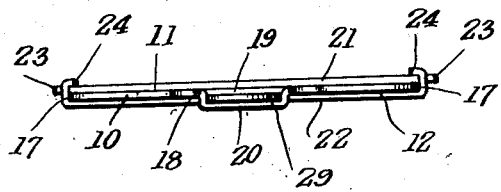
Figure 4 is an end view looking from the bottom of the device.

The calculator consists essentially of a flat plate and co-operative slide, the plate, generally designated by the numeral 10, having its two surfaces, respectively 11 and 12, marked off into relatively small squares 13, surrounding which is a clear margin 14.

The upper marginal surface is extended, as at 15, providing space for receiving inscriptions, as advertisements, addresses, etc. of a permanent nature, and it will be noted that the side edges 16 of this portion of the plate extend slightly outward beyond the parallel edges 17 of its main portion, the four corners being neatly rounded as shown.

On each of the squares 13, on the side 11 of the plate, are disposed numerals arranged in horizontal and vertical rows, the numerals reading from the upper left hand corner in regular consecutive order, both downwardly and to the right, the corner numeral being the integer 1.

In a similar manner the squares on the opposite side 12 of the plate are provided with numerals, the upper and left hand rows being in consecutive order and the remaining squares supplied with numerals which represent, in each square the product of the numeral in the uppermost horizontal row, directly over it, and the numeral in the first vertical row alining with it.

An extension 18, integral with the lower edge of the plate, is slit, as at 19, and formed to present a flattened loop or offset cross bar 20 disposed centrally of the plate.

A sectional slide or band is composed of a relatively narrow rectangular plate 21 disposed over the side 11 of the main plate and a corresponding element 22 over the side 12.

Said slide plate 21 corresponds in length with the width of the plate 10 and has extensions 23 at the central portion of its ends reaching past the plate.

The slide element 22 has its ends formed with mating flanged extensions 24 bent reentrantly to project over the plate 10 and ends of the slide element 21, clamping the slide elements rigidly together but allowing movement of the slide relative to the plate 10 in a vertical or longitudinal direction, the extending edges of the plate element 15 acting as steps, limiting the upward movement of the slide.

The element 21 contains an elongated slot 25 through which any of the horizontal rows of numerals on the squares 13 of side 11 can be seen by properly shifting the slide, and above the slot are a row of squares 26, the first of which contains a blank and the remaining squares a series of numerals advancing in consecutive order from unity.

These numerals, like the first vertical row on the plate, are preferably made in a different color or style so as to be easily differentiated and on the space below the slot, the words Addition & subtraction may appear as shown.

A similar slot 27 is formed in the slide element 22 over which are squares 28, carrying a row of numerals corresponding to those in the uppermost row on the plate and distinguished by color or shape, as are also the first vertical row of numerals on the side 12 of the plate.

Below the slot the word Multiplication may appear and extending integrally centrally from the lower edge of the slide element 22, is a flat stem 29 suited to engage below the raised bar of the loop 20 to be slidably guided by it.

This stem 29 acts obviously as a handle by which the slide, as a unit, can be conveniently manipulated and the slots brought into registration with desired rows of numerals on each side of the plate 10.

In operation let it be assumed that it is desired to add four to seven. In order to perform this calculation, the side 11 of the plate is used and by maneuvering, the stem the slot 25 is brought into register with the numeral 4 in the first or left hand vertical row of figures, and the eye will see displayed, directly below the numeral 7, the figures 11 which is the sum of four plus seven.

Subtraction is obviously performed in a like but reverse manner.

In performing multiplication the reverse side of the plate is used and, taking the same numbers, viz, four multiplied by seven, the product 28 is instantly seen.

In calculations involving larger amounts than appears on the surface of the plate, the usual process of carrying the left hand figures is employed and, as the calculations are entirely mechanical, the results are invariably correct.

From the foregoing disclosure it will be seen that a simple implement, easily operated and not readily liable to become disordered has been described as being the preferred embodiment of the invention.

It will be apparent, however, that minor changes may be made in its construction, without the exercise of invention or conflicting with the scope of the claims hereto appended.

It will also be understood that in the foregoing description and in the appended claims we have used the word "factor" in its broad sense as indicating one or a row of elements used in any calculation, and not merely as applied to a numeral or row of numerals used in multiplication.

Having thus described our invention, what we claim as new and desire to secure by Letters Patent, is:—

1. In a calculator of the class described, a plate, a T shaped slide movable longitudinally of said plate, flanges formed on the ends of the upper member of said slide engaging the edges of said plate, said member having an elongated horizontal sight opening, and a loop integral with said plate through which the lower member of said slide extends.

2. In a calculator of the class described, a plate, a band encompassing said plate and slidable longitudinally thereof, said band having elongated slots through which indicia on each side of said plate may be seen, a flat stem formed on said band extending centrally over said plate on one side thereof, and means formed integrally with said plate for guiding said stem, said stem extending at all times into an accessible position.

Signed at New York, in the county of New York and State of New York, this 20th day of December A. D. 1922.

ADOLPH HUNAU.
PAUL HAMMALIAN.